Figure 1:
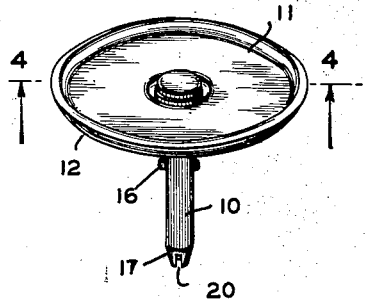

July 2, 1963

R. L. HALLOCK 3,095,777

DRIVEN FASTENER HAVING PENETRATING POINT
FOR ATTACHING OBJECTS TO METAL

Filed June 2, 1960

2 Sheets-Sheet 1

INVENTOR
R. L. HALLOCK

BY A. Yates Dowell
ATTORNEY

July 2, 1963   R. L. HALLOCK   3,095,777
DRIVEN FASTENER HAVING PENETRATING POINT
FOR ATTACHING OBJECTS TO METAL
Filed June 2, 1960   2 Sheets-Sheet 2
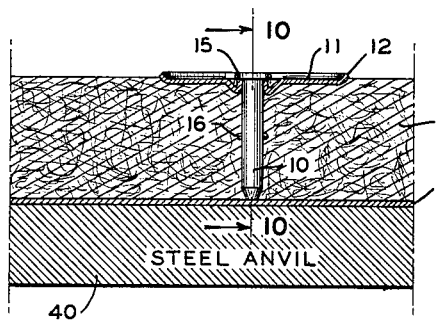
FIG. 9
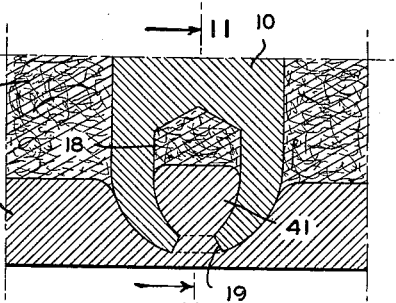
FIG. 10
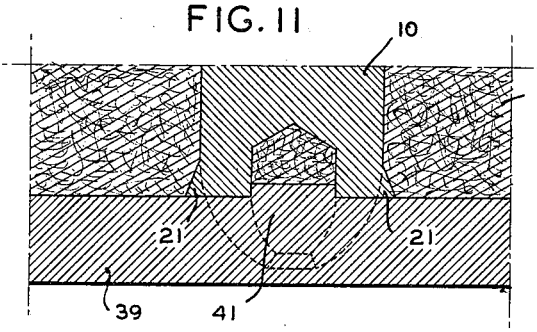
FIG. 11
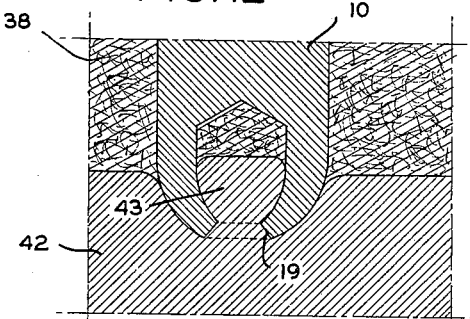
FIG. 12
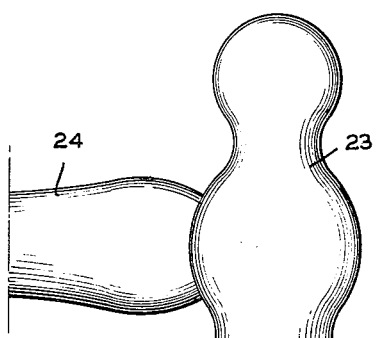
FIG. 13
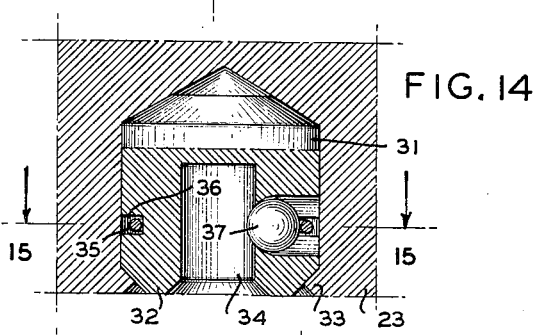
FIG. 14
FIG. 15
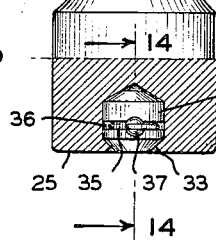
INVENTOR
R. L. HALLOCK
BY
A. Yates Dowell
ATTORNEY United States Patent Office 3,095,777
Patented July 2, 1963

3,095,777
DRIVEN FASTENER HAVING PENETRATING POINT FOR ATTACHING OBJECTS TO METAL
Robert Lay Hallock, 32 Vine Road, Larchmont, N.Y.
Filed June 2, 1960, Ser. No. 33,572
7 Claims. (Cl. 85—31)

This invention relates to the joining together of objects, to mechanical fasteners by which such joining may be accomplished, and particularly to driven fasteners for connecting objects having similar or highly dissimilar characteristics of physical hardness such as in the attachment of metal to metal or flexible slab or board type insulation to metal.

The invention relates specifically to nails or driven fasteners by which objects of any desired character including those of relatively soft characteristics such as fiberglass insulation can be connected to metal by a direct driving action and when the metal is relatively thin without the complete penetration of the driven element through such thin metal.

Difficulty has been experienced in securing to a relatively hard base such as sheet, plate or structural metal relatively soft materials in sheet or other forms such as insulation board or other material of a nature and ability to spring back after being subjected to pressure and such pressure relieved. Efforts have been made to provide satisfactory mechanical fasteners for securing objects of various kinds to metal in sheet, plate or structural form with such efforts unsuccessful due to the ineffective holding qualities, the ease with which the joints could be broken, the tearing or creation of undesirable holes in the objects or the metal to which they were attached, and for other reasons.

It is an object of the invention to provide a solution to the above problem by providing a relatively simple and inexpensive nail or driven fastener, which can be driven or nailed into thin sheet metal, into heavier plate, or into massive structural steel to provide a positive connection therewith.

Another object of the invention is to provide a nail or fastener of the type indicated which can be readily manufactured, inexpensively, in large quantities, and sold at a competitive price.

Another object of the invention is to provide a nail or driven fastener which may be driven into sheet metal but which will not penetrate entirely through the sheet but will cling to or grip the metal in a manner comparable to that of a weld or rivet.

A further object of the invention is to provide a nail which can be driven into metal, such nail having a cavity in its driving end, with such end provided with a taper decreasing toward its extremity to cause the wall about the cavity at the end of the nail to contract or close inwardly towards the longitudinal axis of the nail and bite into the metal into which the nail is driven, the nail formed with radial slots leading from the cavity outwardly at each side when the nail is to be driven into thin sheet metal so that the end of the nail will be in form of a pair of opposed gripping jaws with the slots providing spaces between them through which a neck of metal will be formed for holding the gripped portion of the metal to the main body thereof.

A further object of the invention is to provide a nail having a cavity in its driving end at least as large inwardly of its extremity as at its extremity and with the outer surface of the extremity of reduced taper towards the extremity so that when the nail is driven into metal, due to the taper about its exterior its driving end will be constricted as it is driven into the metal and as it is constricted an attached portion of metal will be received in the cavity in the nail and the metal into which it is driven will be firmly united with the nail.

A still further object of the invention is to provide a nail which can be driven into sheet metal with such nail having a reduced external taper towards its driving or penetrating end, a cavity within such driving end with the metal of the nail about the cavity and within the reduced taper terminating in a relatively blunt or flat driving extremity.

A still further object of the invention is to provide a nail which can be driven into metal with an inward gripping action and having a shank with an enlarged head axially slideably retained between fixed stops on said shank so that the head may move to compensate for the springiness of material through which the nail is driven.

Figure 2:
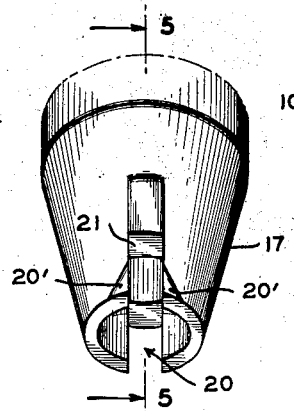
Figure 3:
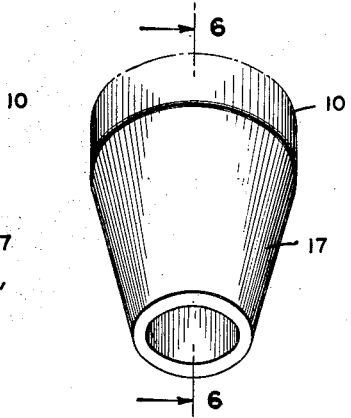
Figure 4:
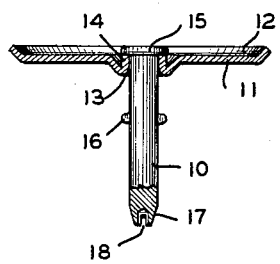
Figure 5:
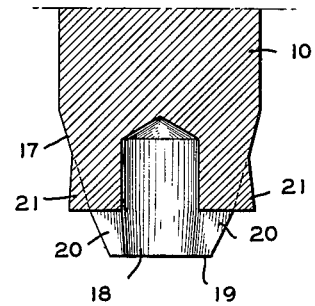
Figure 6:
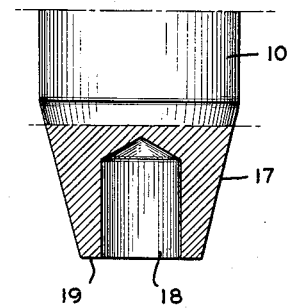
Figure 7:
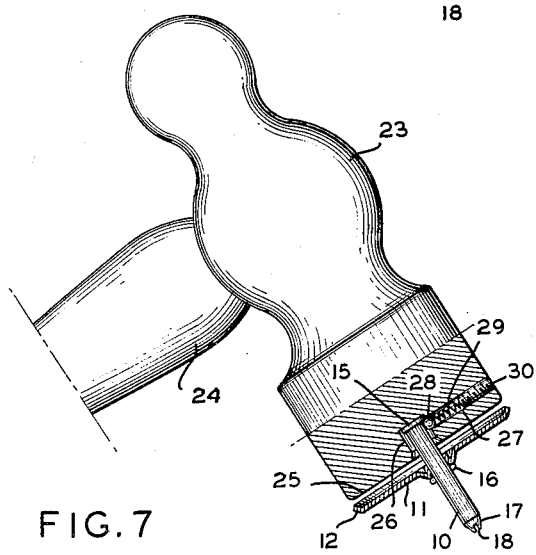
Figure 8:
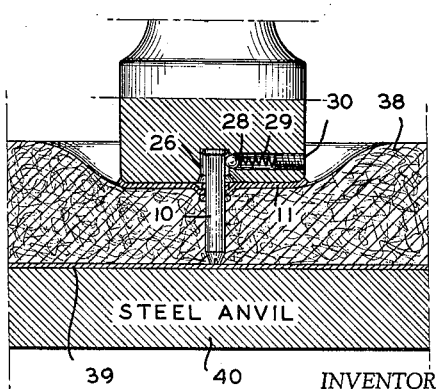

Other objects and advantages of the invention will be apparent from the following description taken in conjunction with the accompanying drawings wherein:

FIG. 1 is a perspective illustrating one application of the invention;
FIG. 2, an enlarged fragmentary perspective of the driving or penetrating end of the nail for use with thin sheet metal;
FIG. 3, a similar view for use with plate or structural steel;
FIG. 4, a longitudinal section on the line 4—4 of FIG. 1;
FIG. 5, a longitudinal section on the line 5—5 of FIG. 2;
FIG. 6, a longitudinal section on the line 6—6 of FIG. 3;
FIG. 7, a perspective of a hammer or applicator with a nail attached;
FIG. 8, a fragmentary detail showing the moment of application to thin sheet metal supported by a backing member in the form of a steel anvil;
FIG. 9, a view of the nail of FIGS. 2 and 8 after the hammer or applicator tool has been removed;
FIG. 10, an enlarged fragmentary vertical section on the line 10—10 of FIG. 9;
FIG. 11, a similar view at right angles to that of FIG. 10 on the line 11—11 of FIG. 10;
FIG. 12, a similar view showing the use of the nail of FIG. 3 with plate or structural steel;
FIG. 13, a perspective of a hammer with a portion broken away to reveal a hardened nail holding insert;
FIG. 14, an enlarged section on the line 14—14 of FIG. 13; and
FIG. 15, a horizontal section on the line 15—15 of FIG. 14.

Briefly stated, the invention is a nail or driven fastener having a shank with driving and driven ends and an enlarged head axially movable on the shank between fixed stops with the enlargement of the head and the projection on the shank spaced from the head thus permitting the head to move when the nail is driven through relatively soft material such as insulation board, the driving end of the shank being substantially flat or blunt and with an axial cavity leading inwardly from such end and with the exterior of the driving end provided with a reduced taper towards its point and leaving a relatively narrow end portion between the cavity and the exterior of the shank so that during driving the taper on the exterior of the nail will cause a contraction of the nail about the cavity and cause gripping of the metal into which the nail is driven, and additionally when the nail is to be driven into thin sheet metal the portion of the nail between the cavity and the tapered exterior being provided with slots leading from the cavity in opposed relation along the diameter to provide a connecting portion in the metal of the sheet into which the nail is driven between the portion centrally gripped by the nail and the surrounding portion and make it possible to drive the nail into thin sheet metal and obtain a positive connection without the nail having to penetrate completely through the sheet.

With continued reference to the drawings, the nail of the present invention has a shank 10 on which is axially slideable an enlarged head 11 having a marginal rounded or angularly bent rim 12 which serves the dual purpose of strengthening the head and preventing cutting of the material through which it is driven.

In order to accommodate the shank 10 the head is provided with a central opening 13, the metal about such opening being in the form of a sleeve 14 for extended contact between the head and the shank. The end of the sleeve 14 at the top of the nail preferably is flush with or in the plane of the upper surface of the head 11.

The head 11 may be retained on the shank 10 in any desired manner but preferably permitted to move axially on the shank and in order to accomplish this, the shank is provided with an enlargement or retention head 15 at the driven end of the shank and at the proper spacing therefrom abutment means 16 which members serve to retain the head in position so that the upper end of the sleeve 14 will engage the retention head 15 and with the opposite end of the sleeve adapted to engage the abutment means 16, thus the head is attached to the shank for movement to compensate for the yielding of the material through which the nail is driven and permitting its return to its initial precompressed position.

The penetrating or driving end of the shank 10 is provided about its exterior with a taper reduced towards its penetrating extremity for the purpose of exerting force inwardly on the penetrating end of the shank during the driving action and to accommodate this application of external pressure and provide for the gripping of the metal or other material into which the nail is driven, the penetrating end of the shank is provided with an internal cavity 18 with the material of the shank between the cavity and the tapered exterior terminating in a relatively blunt driving extremity 19, the radial thickness of which is sufficient to insure inward movement or movement toward the axis of the shank in a gradual progression during the driving of the nail. Also when the nail is driven into relatively thin sheet metal, such blunt driving extremity will not extend all the way through such sheet metal.

In the driving of the nail into metal the constriction of the end caused by the taper on the exterior of such driving end of the nail will engage and tend to encircle a hunk or bulbous mass of the metal into which the nail is driven and thus provide a positive gripping action, the hunk of metal being attached by an integral connection to the main body along the line of the extended axis of the nail. When the metal is in relatively thin sheet form, due to the mass of metal gripped having a short axis, such gripped portion of the metal for additional strength may be left with a lateral connection to the metal of the surrounding sheet by the provision of a pair of slots 20 leading from the cavity 18 to the exterior along the diameter of the driving or penetrating end of the nail thus leaving a central portion connected by a pair of oppositely disposed radial or diametrical portions.

In forming the slots 20 a narrow segment of metal between the cavity 18 and the tapered exterior of the penetrating or driving end of the nail is forced rearwardly along the axis of the shank to provide an external enlargement 21.

In providing the shank 10 with the slots 20 four exterior corners 20' are moved inwardly a slight amount so that they have a taper in addition to that of the taper 17 and when the nail is driven, these corners move inwardly ahead of the contraction of the generally U-shaped portions which connect each pair of corners at opposite sides of the slots 20, thereby increasing the engagement and gripping action between the nail and the metal into which it is driven.

As illustrated in FIGS. 7, 8 and 13 to 15, inclusive, the nail may be applied by means of an applicator in the form of a hammer comprising a head 23 on a handle 24, such head having a driving surface 25 of a size preferably corresponding to the size of the head 11 of the nail and with an axial recess 26 of a size to slideably receive the extremely small retention head 15 of the shank 10. The head and shank fit snugly within the axial recess of the hammer and for a sufficient extent that there is adequate support for the nail to hold the same in the line of applied force while being driven. In order to retain the nail in the axial recess 26 the head is provided with a radial recess 27 opening into the recess 26 and with a ball 28 urged by a spring 29 into contact with the shank of the nail, the spring being held in the radial opening 27 by means of a screw 30.

If desired the hammer may be provided with a recess 31 slightly larger than the recess 26 and a removable retention member 32 received therein and held by means of the forcing of the metal into an overlying position 33 to retain the member 32 in place. The member 32 has a central opening 34 into which the nail is adapted to be received and be held by a circular spring 35 in a slot 36 bearing upon a detent forming ball 37.

In FIGS. 8 and 9 the nail is shown for securing sheet insulation 38 of fiber glass or the like to relatively thin sheet metal 39 supported by a backing member 40 such as a steel anvil or the like, the insulation being depressed during the driving action and as illustrated in FIG. 9 returning to its initial uncompressed condition after removal of the tool.

The structure of the joint between the nail and the sheet metal is illustrated in the enlarged views of FIGS. 10 and 11 in which the shank 10 is disposed at right angles to that of FIG. 11, the section of FIG. 11 being through the slots 20 and the hunk or bulbous mass of metal 41 being substantially encircled by the constricted end portion of the nail.

In FIG. 12 there is disclosed the nail applied to plate or structural steel 42, the nail not having the slots 20 of FIGS. 2, 5, 9, 10 and 11 but substantially encircling a hunk or bulbous mass of metal 43.

In the production of the present invention it is intended that the fastener may be produced of steel and may be hardened when desirable or necessary to enable it to penetrate harder metal or other material into which it is adapted to be driven. Also the opening or cavity leading into the shank from the penetrating end must be sufficiently deep to accommodate any compressed material through which the nail is driven.

The penetrating end of the nail when applied is adapted to contact or move centrally in an arc to embrace a bulbous mass of the metal into which it is driven and locked. There are two important reasons for having the driving end contract toward the horizontal axis of the shank. The first is to cause the driving end to grip around a bulbous portion of the metal into which the nail is being driven, thereby forming a somewhat ball and socket type connection which allows the driven end of the nail to move back and forth without breaking the bond between the wood and the metal and, secondly, the nail can be of a greater hardness without cracking when driven when the blunt end 19 of the nail is compressed from contraction than when it is under tension or bending outward away from the axis.

The fastener of the present invention also is intended to be used with thin sheet metal on the order of .030 inch and is particularly appropriate for securing insulation to air ducts used in heating, ventilating, and air conditioning, oil tanks, and other area defining structures, which ducts or structures must not be penetrated to form openings therein which would permit the escaping of air or other material.

It will be apparent from the foregoing that by the present invention a nail is provided which may be readily driven into metal to fasten sheet insulation or other objects to the metal and which when so driven the nail will have a solid gripping engagement therewith due to the substantial encirclement of a mass of the metal into which the nail is driven.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A fastener comprising a shank having driving and driven end portions, said driving end portion having an external taper decreasing in size toward its driving extremity, said shank having an axially extending cavity in its driving extremity extending inwardly sufficiently to allow the necessary penetration of the fastener into the metal into which it is driven, the penetrating extremity of said fastener terminating in a blunt substantially flat end the surface of which is transverse to the wall of said cavity with the joint between such blunt end surface and cavity wall and between the external taper and blunt end each becoming cutting edges when the fastener is driven into metal, the relation of the external taper and the wall thickness of the blunt end surface of the driving end of the shank of said fastener being of such character that the endwise application of impact force to said shank will cause penetration of the metal into which the fastener is driven and will cause the cutting end to be directed inwardly toward the axis of the shank in a manner to cause cutting as its travels with a gradually progressive contractual movement and with a bulbous mass of metal collected and retained within said cavity while maintaining its connection with said metal.

2. The structure of claim 1 in which the connection between the nail and the bulbous mass of metal into which the nail is driven is generally of ball and socket type.

3. The structure of claim 1 in which the blunt end is transversely slotted to provide connecting means between the metal on the interior and exterior of the cavity when the fastener is driven into relatively thin metal.

4. The structure of claim 1 in which the blunt end is provided with aligned diametrically opposed slots to provide connecting means between the metal on the interior and exterior of the cavity when the fastener is driven into relatively thin metal.

5. The structure of claim 1 in which the blunt driving end between the cavity and the penetrating portion is transversely slotted less than the depth of the cavity.

6. The structure of claim 1 in which the blunt end is transversely slotted and an end portion thereof is at an angle to the remainder of such slotted portion.

7. The structure of claim 1 in which the cutting end of the fastener is hardened.

References Cited in the file of this patent

UNITED STATES PATENTS

| | | |
|---|---|---|
| 180,747 | Bray | Aug. 8, 1876 |
| 1,279,362 | Krueger | Sept. 17, 1918 |
| 1,349,183 | Anderson | Aug. 10, 1920 |
| 1,930,611 | Freter | Oct. 17, 1933 |
| 2,048,093 | Alpeters | July 21, 1936 |
| 2,896,755 | Levine | July 28, 1959 |
| 2,900,863 | Maynard | Aug. 25, 1959 |